United States Patent [19]

Hsu

[11] Patent Number: 5,609,536

[45] Date of Patent: Mar. 11, 1997

[54] BICYCLE FREEWHEEL GEAR CLUSTER GEAR-SHIFTING MECHANISM

[75] Inventor: Sheng-Sheuan Hsu, Tao Yuan, Taiwan

[73] Assignee: Tracer Company, Ltd., Taiwan

[21] Appl. No.: 489,810

[22] Filed: Jun. 13, 1995

[51] Int. Cl.[6] .................................................. B62M 9/12
[52] U.S. Cl. ............................................ 474/160; 474/164
[58] Field of Search ................................. 474/152, 156, 474/158, 160, 164

[56] References Cited

U.S. PATENT DOCUMENTS

| | | | |
|---|---|---|---|
| 3,654,814 | 4/1972 | Richmond | 474/156 |
| 4,198,876 | 4/1980 | Nagano | 474/160 |
| 4,580,997 | 4/1986 | Browning et al. | 474/160 X |
| 5,078,653 | 1/1992 | Nagano | 474/160 X |
| 5,192,248 | 3/1993 | Nagano | 474/160 X |
| 5,273,495 | 12/1993 | Nagano | 474/160 X |
| 5,413,534 | 5/1995 | Nagano | 474/164 X |
| 5,458,543 | 10/1995 | Kobayashi | 474/160 |

Primary Examiner—Roger J. Schoeppel
Attorney, Agent, or Firm—Shoemaker and Mattare, Ltd.

[57] ABSTRACT

Disclosed is an improvement on bicycle freewheel gear cluster gear-shifting mechanism having at least at least a large-diameter sprocket wheel, an intermediate-diameter sprocket wheel. The improvement includes a plurality of protrusions provided on the rim of the large-diameter sprocket wheel on the side facing the intermediate-diameter sprocket wheel. The plurality of protrusions can be used to prevent the drive chain from overshooting to the large-diameter sprocket wheel when the drive chain is being shifted from the small-diameter sprocket wheel to the intermediate-diameter sprocket wheel. Additionally, a plurality of protrusions are provided on the rim of the large-diameter sprocket wheel near the gear-up assistant hooking members. The plurality of protrusions can be used to prevent the drive chain from being hooked up by the gear-up assistant hooking members when the drive chain is being shifted from the large-diameter sprocket wheel down to the small-diameter sprocket wheel. Further, a gap is provided between the bottom of the gear-up assistant member and the sprocket wheel capable of imbedding the links of the drive chain so as to allow the drive chain to be shifted smoothly.

7 Claims, 8 Drawing Sheets

BICYCLE FREEWHEEL GEAR CLUSTER GEAR-SHIFTING MECHANISM

BACKGROUND OF THE INVENTION

1. Field of the Invention

The present invention relates to bicycle freewheel gear clusters, and more particularly, to an improvement on bicycle freewheel gear cluster gear-shifting mechanism that shifts the drive chain from one sprocket wheel to another.

2. Description of Prior Art

Conventional freewheel gear cluster at the rear of a bicycle includes a number of sprocket wheels provided about the same axis and having different diameters. A derailleur (a gear-shifting mechanism) is used to shift the drive chain of the bicycle from one sprocket wheel to another. In general, the drive chain is shifted to a sprocket wheel having a larger diameter (gear up) when the bicycle is climbing up a hill, and shifted to one having a smaller diameter (gear down) when the bicyclist wants to ride the bicycle at high speeds.

It is a drawback of the conventional freewheel gear cluster that when gearing up from a small-diameter sprocket wheel to an intermediate-diameter one, the drive chain may overshoot to and touches the rim of the large-diameter sprocket wheel (as illustrated by dotted lines in FIG. 6), thus causing the drive chain to rub against the rim of the large-diameter sprocket wheel and thereby generating noise. Worse, due to the overshoot, the chain wheel can hardly be quickly and precisely engaged with the intermediate-diameter sprocket wheel.

To solve the aforementioned problem, a prior art method is to provide protrusions on the rim of the intermediate-diameter sprocket wheel facing the small-diameter sprocket wheel. These protrusions allow the drive chain to be meshed on them when the drive chain is gearing up from the small-diameter sprocket wheel to the intermediate-diameter one. The large-diameter sprocket wheel is also provided with such protrusions allowing smooth gearing of the drive chain from the intermediate-diameter sprocket wheel up to it.

It is, however, a disadvantage of the prior art method that the drive chain may not be properly meshed on the target sprocket wheel if the bicyclist operates the derailleur improperly or if the drive chain is loose or the protrusions are worn out.

Still, when the drive chain is gearing down to a smaller sprocket wheel, the links of the chain can be caught by the protrusions, thus causing the drive chain not to run smoothly through the gear-down operation.

SUMMARY OF THE INVENTION

It is therefore a primary objective of the present invention to provide an improvement on bicycle freewheel gear cluster gear-shifting mechanism that allows the drive chain to be engaged with the target sprocket wheel when shifting from a small-diameter sprocket wheel up to an intermediate-diameter one without overshooting to the large-diameter sprocket wheel.

It is another objective of the present invention to provide an improvement on bicycle freewheel gear cluster gear-shifting mechanism that shifts the drive chain from one sprocket wheel to another smoothly.

It is still another objective of the present invention to provide an improvement on bicycle freewheel gear cluster gear-shifting mechanism that, even though protrusions are provided on each sprocket wheel, allows the drive chain to be geared down from one large-diameter sprocket wheel to a smaller one.

In accordance with the foregoing and other objectives of the present invention, there is provided with a novel improvement on bicycle freewheel gear cluster gear-shifting mechanism. The improvement comprises a plurality of protrusions provided on the rim of the large-diameter sprocket wheel on the side facing the intermediate-diameter sprocket wheel. The plurality of protrusions can be used to prevent the drive chain from overshooting to the large-diameter sprocket wheel when the drive chain is being shifted from the small-diameter sprocket wheel to the intermediate-diameter sprocket wheel.

Additionally, a plurality of protrusions are provided on the rim of the large-diameter sprocket wheel near the gear-up assistant hooking members. The plurality of protrusions can be used to prevent the drive chain from being hooked up by the gear-up assistant hooking members when the drive chain is being shifted from the large-diameter sprocket wheel down to the small-diameter sprocket wheel. Further, a gap is provided between the bottom of the gear-up assistant member and the sprocket wheel capable of imbedding the links of the drive chain so as to allow the drive chain to be shifted smoothly.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

In the following description, the present invention is embodied on a bicycle having its rear freewheel gear cluster including three sprocket wheels as depicted in the accompanying drawings. It is to be understood, however, that the present invention can also be embodied on freewheel gear cluster including any number of sprocket wheels.

Figure 1:
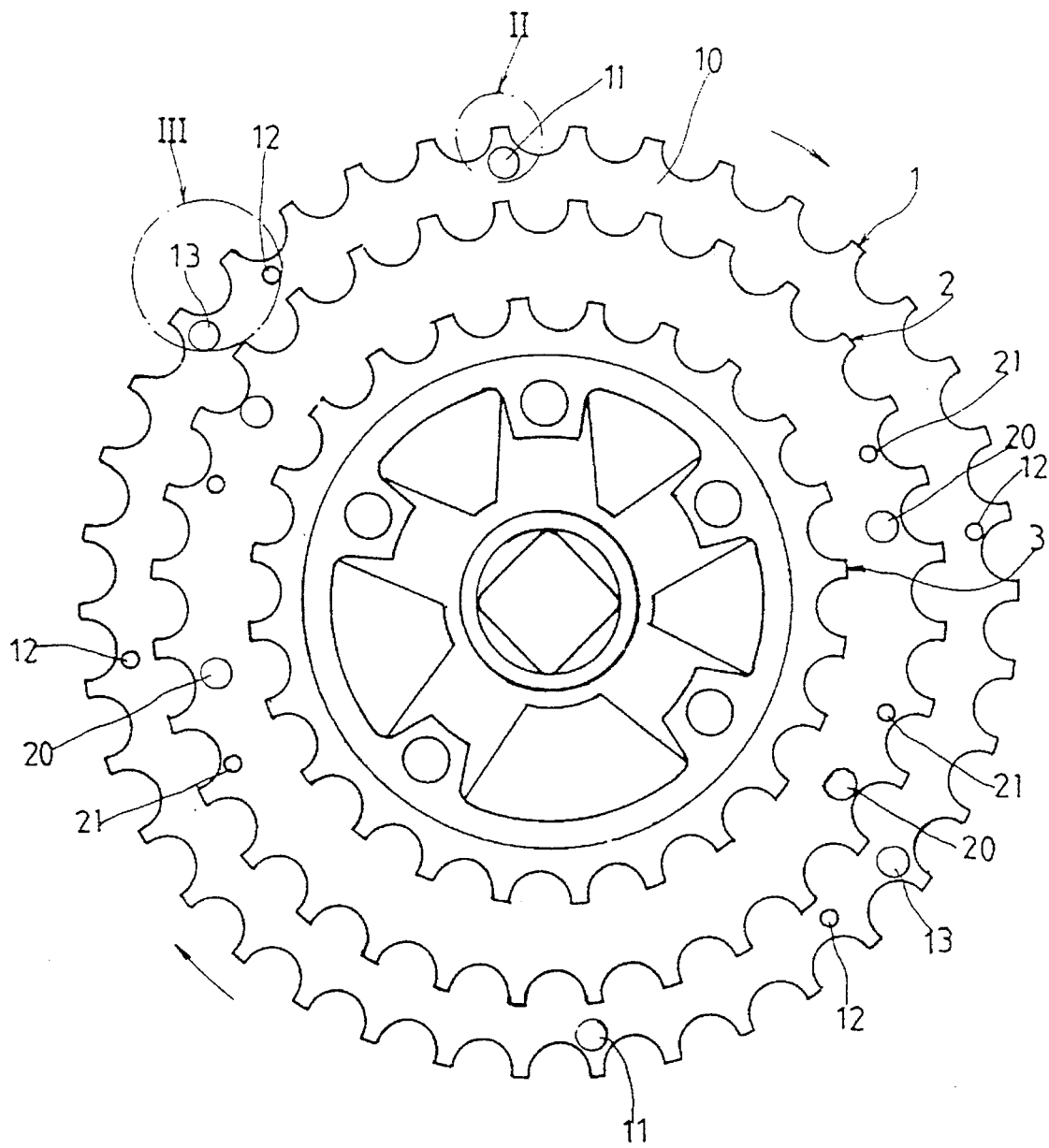
FIG. 1 shows a plan view of the bicycle freewheel gear cluster according to the present invention.
Figure 2:
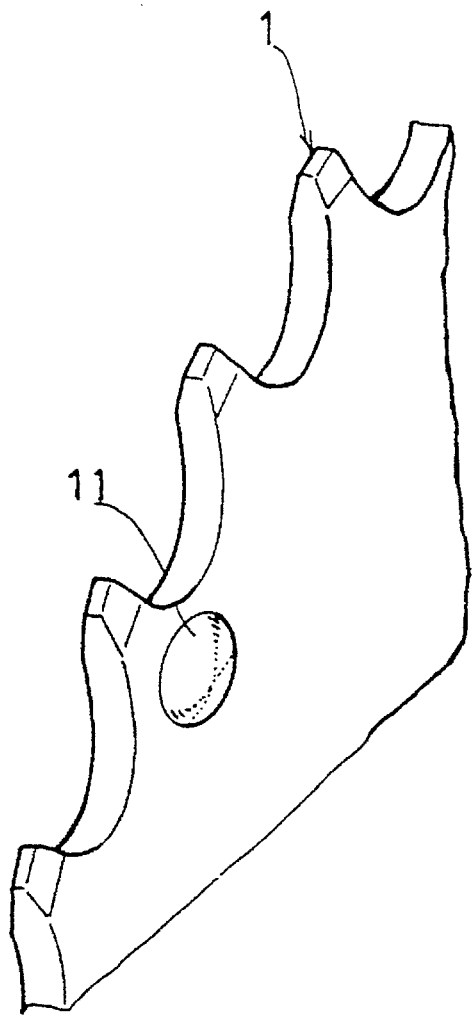
FIG. 2 shows a perspective view of a part (II) of the bicycle freewheel gear cluster of FIG. 1.
Figure 3:
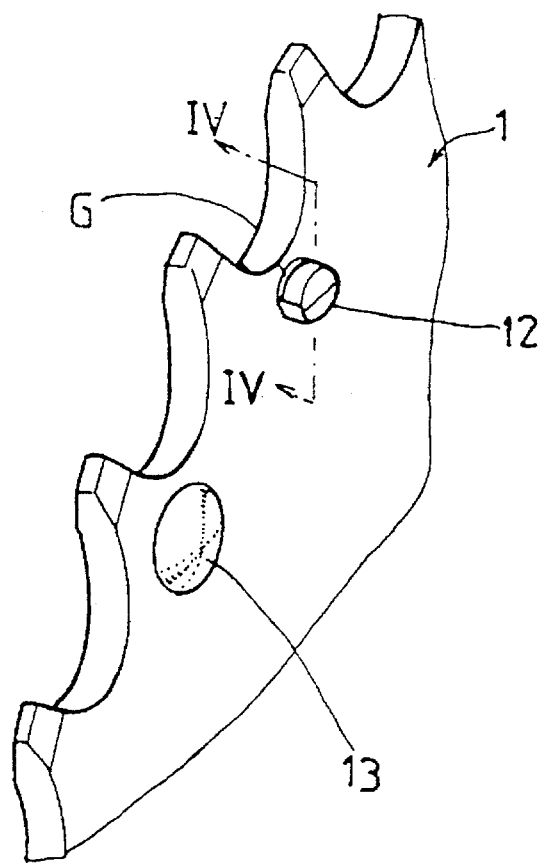
FIG. 3 shows a perspective view of another part (III) of on the bicycle freewheel gear cluster of FIG. 1.
Figure 4:
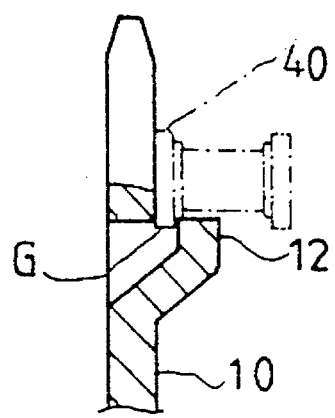
FIG. 4 shows a cross sectional view cutting through the IV—IV line in FIG. 3.

Referring to FIG. 1 and FIG. 2, the bicycle freewheel gear cluster includes three sprocket wheels: a large-diameter sprocket wheel 1, an intermediate-diameter sprocket wheel 2, and a small-diameter sprocket wheel 3 provided on the same axis. Among them, the large-diameter sprocket wheel 1 has its rim 10 on the side facing the intermediate-diameter sprocket wheel 2 provided with a plurality of dome-like protrusions 11 each located beneath the peak of a tooth on the sprocket wheel. In addition, there are provided a plurality of hooking member 12 and a plurality of gear-down assistant members 13. Each of the hooking member 12 is arranged near the valley between two adjacent teeth and is a cylindrical member as illustrated in FIGS. 3 and 4; and the gear-down member 13 is also dome-like shaped as the protrusions 11. A gap G is formed between the bottom of the hooking member 12 and the surface of the rim 10 of the large-diameter sprocket wheel 1.

The dome-like protrusions 11, the hooking member (also a dome-like protrusion) 12, and the gear-down member 13 are integrally formed with the large-diameter sprocket wheel 1 by pressing. Besides, they can be made separately and then affixed onto the large-diameter sprocket wheel by welding. The height of the two dome-like protrusions 11, 13 should be equal to or larger than that of the hooking member 12.

As shown in FIG. 1, the intermediate-diameter sprocket wheel 2 has its rim on the side facing the small-diameter sprocket wheel 3 provided with a plurality of dome-like protrusions 20. Contrary to those provided on the large-diameter sprocket wheel 1, the dome-like protrusions 20 provided here are each located right beneath the valley between two adjacent teeth. Besides, a plurality of hooking member 21 are provided, each being located about a tooth's distance in the counterclockwise direction from one of the dome-like protrusions 20. The making and shapes of the dome-like protrusions 20 and the hooking member 21 are also the same as those (12, 13) described above. Description thereof will therefore not be repeated.

The aforementioned three kinds of dome-like protrusions 11, 13, and 20, although identical in shape and structure, provide different functions: the protrusions 11 on the large-diameter sprocket wheel 1 are used to prevent the drive chain 4 (shown in FIG. 5) from overshooting; and the protrusions 13 on the large-diameter sprocket wheel 1 and the protrusions 20 on the intermediate-diameter sprocket wheel 2 are used to prevent the links of the drive chain 4 from being hooked by the hooking member 12. These two kinds of protrusions 13, 20 can be both provided or only one of them is provided.

Figure 5:
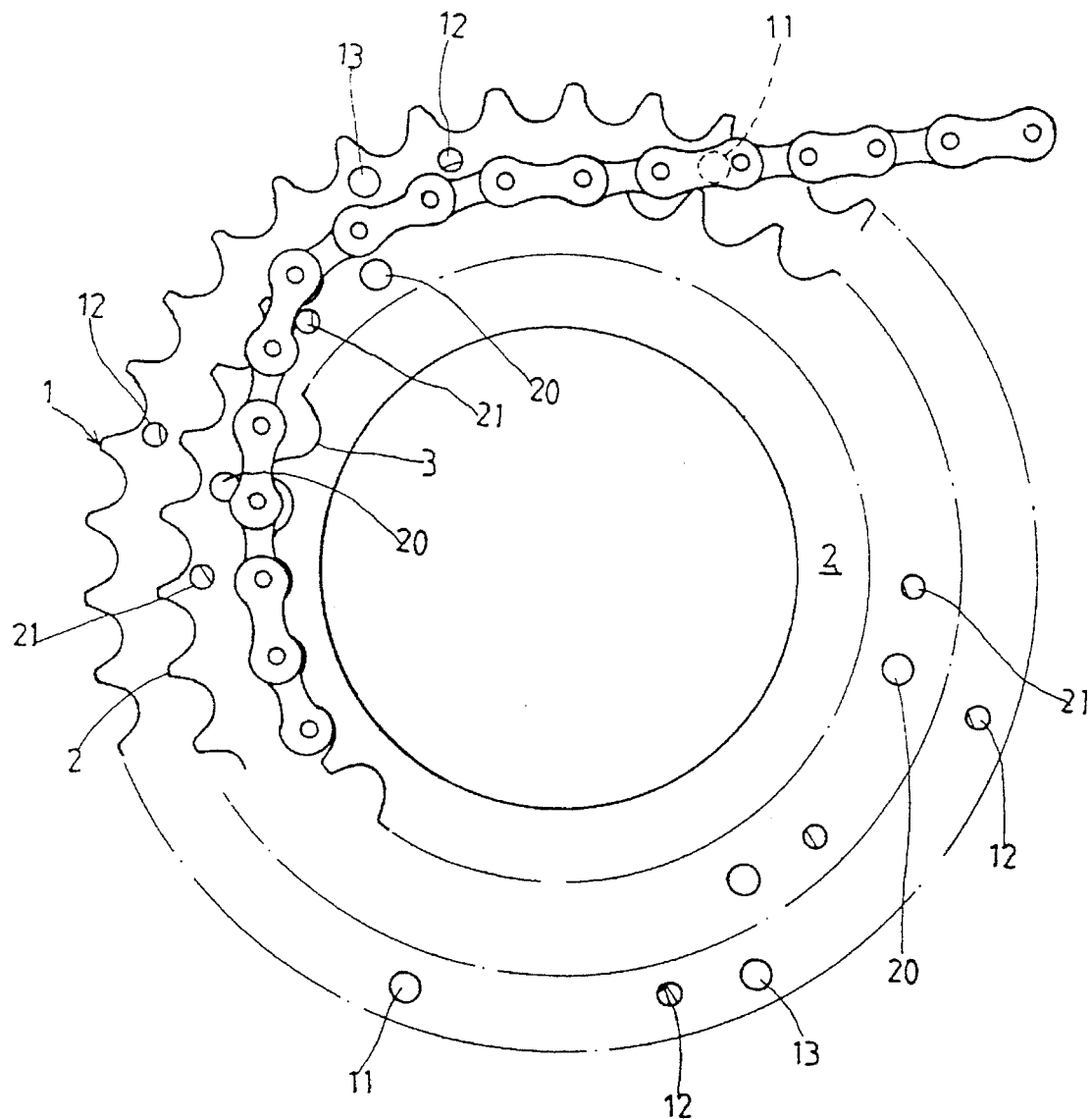
FIG. 5 is a schematic drawing used to depict how the drive chain is shifted from the middle-diameter gearwheel upwards to the large-diameter gearwheel.
Figure 6:
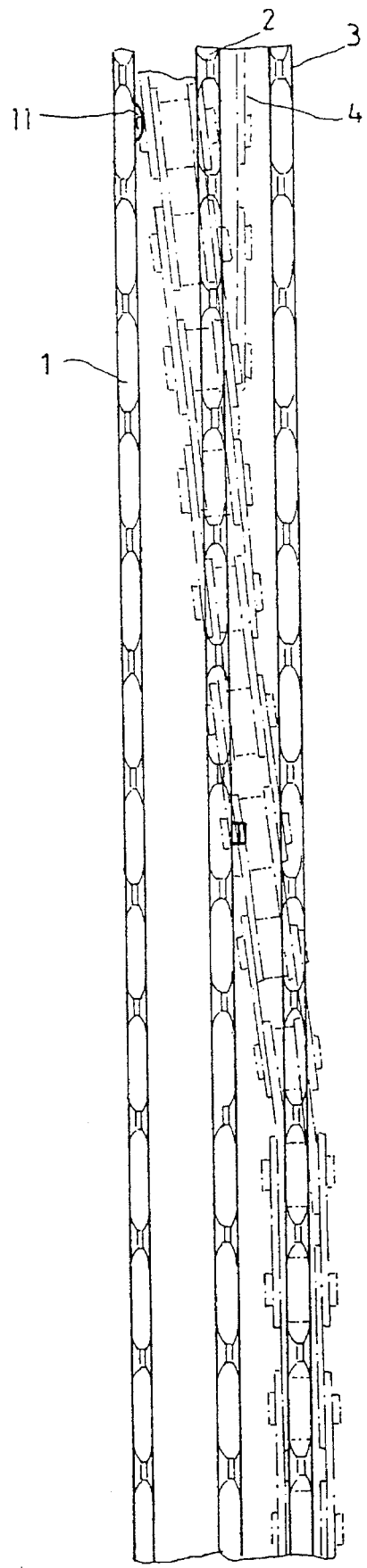
FIG. 6 is a top view (in the direction indicated by VI) of the bicycle freewheel gear cluster shown in FIG. 5.

The operation of the freewheel gear cluster according to the present invention will be described next with reference to FIGS. 5 and 6. When the drive chain 4 is engaged with the small-diameter sprocket wheel 3 and the bicyclist wants to gear up the speed, the bicyclist can operate a derailleur (not shown) to shift the drive chain 4 from the small-diameter sprocket wheel 3 up to the intermediate-diameter sprocket wheel 2, as illustrated in FIG. 5. Further in the process of the gear-up as illustrated in FIG. 6, the drive chain 4 may overshoot to the large-diameter sprocket wheel 1. In the prior art, this would cause the drive chain 4 to rub against the rim of the large-diameter sprocket wheel 1 and, as a consequence, the drive chain 4 can be hardly engaged precisely with the intermediate-diameter sprocket wheel 2 and noise can be produced. However, with the provision of the protrusions 11 on the large-diameter sprocket wheel 1, the links of the drive chain 4 will come in touch with the protrusions, which stop the drive chain 4 from overshooting too much away from the target sprocket wheel (the intermediate-diameter sprocket wheel 2). As a result, the drive chain 4 can be engaged more quickly and precisely with the intermediate-diameter sprocket wheel 2, as illustrated by the imagery lines in FIG. 6.

In another aspect, during the process in which the drive chain 4 is being shifted from the small-diameter sprocket wheel 3 to the intermediate-diameter sprocket wheel 2, the links 40 of the drive chain 4 can be imbedded in the gap G on the hooking member 21 on the intermediate-diameter sprocket wheel 2. The hooking member 21 can thus prevent the drive chain 4 from dropping down and help the drive chain 4 to more reliably engage with the intermediate-diameter sprocket wheel 2. If the drive chain 4 is to be shifted from the intermediate-diameter sprocket wheel 2 to the large-diameter sprocket wheel 1, the hooking member 21 on the large-diameter sprocket wheel 1 can provide the same effect.

Figure 7:
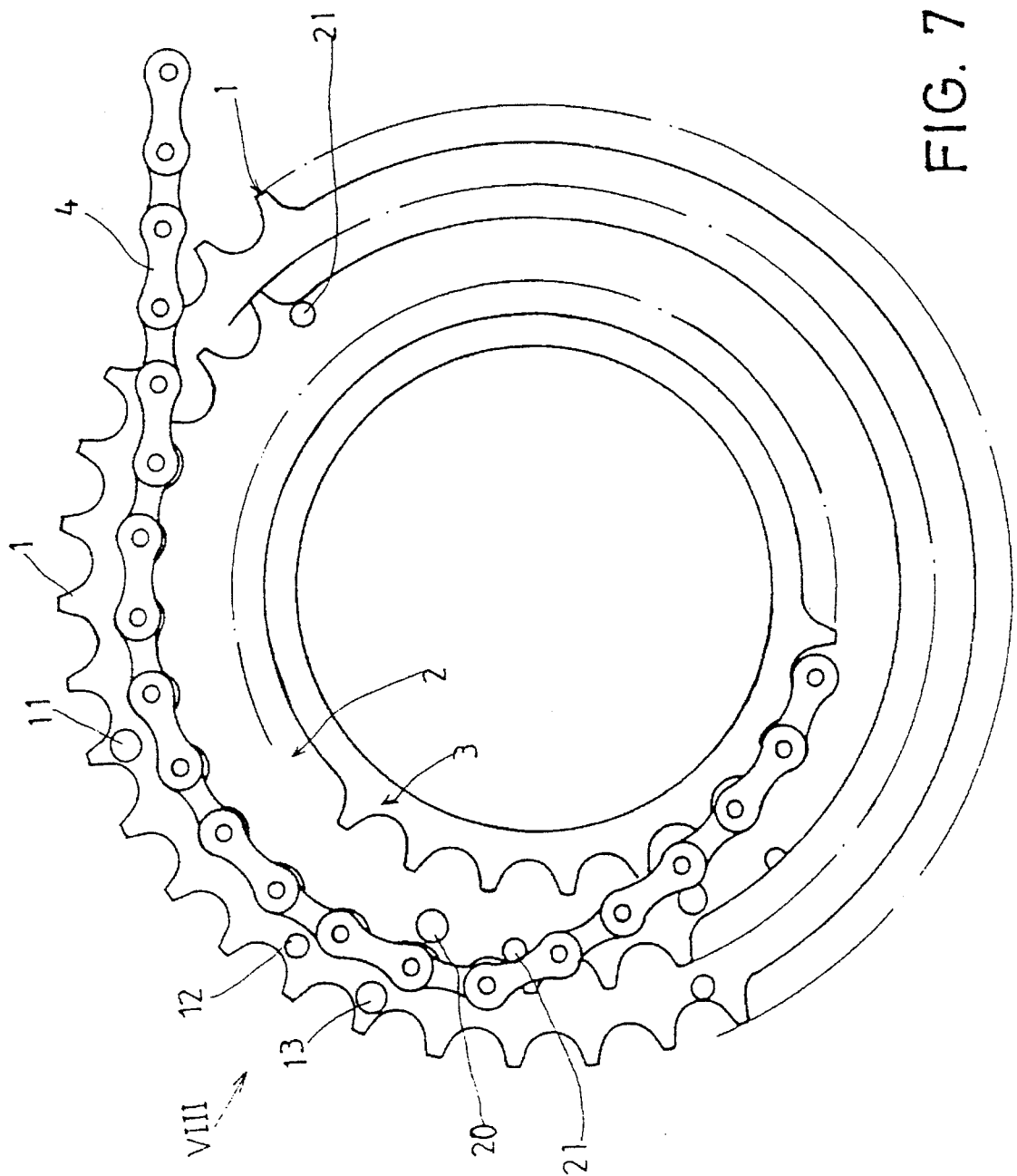
FIG. 7 is a schematic drawing used to depict how the drive chain is shifted from the middle-diameter gearwheel downwards to the small-diameter gearwheel.
Figure 8:
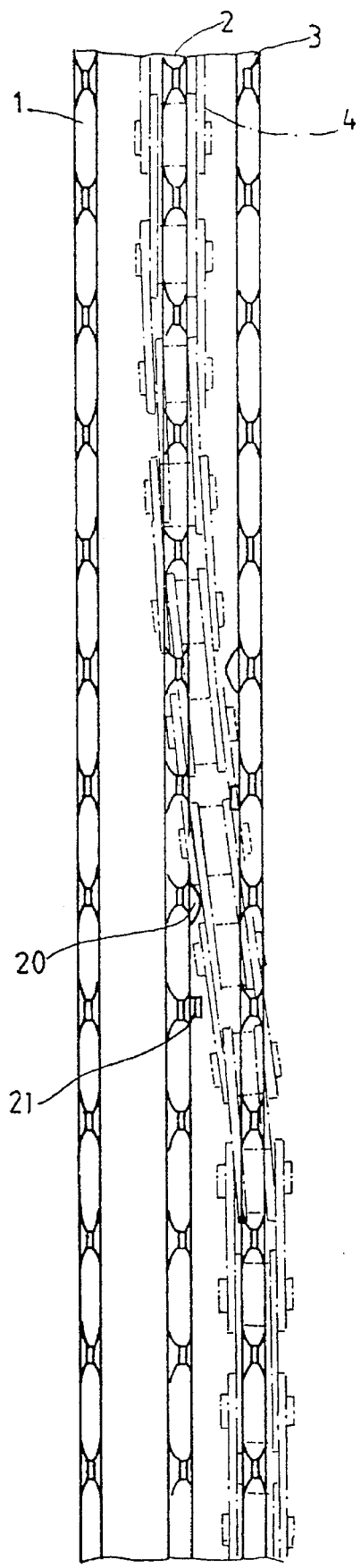
FIG. 8 is a top view (in the direction indicated by VIII) of the bicycle freewheel gear cluster shown in FIG. 7.

Referring further to FIGS. 7 and 8, when the drive chain 4 is at the intermediate-diameter sprocket wheel 2 and the bicyclist wants to gear down, the bicyclist can operate the derailleur (not shown) to shift the drive chain 4 from the intermediate-diameter sprocket wheel 2 down to the small-diameter sprocket wheel 3, as illustrated in FIG. 7. Furthermore, in the process of the gear-down as illustrated in FIG. 8, the links of the drive chain 4 will come in touch with the protrusions 20. This can prevent the late-coming links of the drive chain 4 from getting too near to the hooking member 21 to get hooked by the hooking member 21, thus allowing the drive chain 4 to be shifted smoothly down to the small-diameter sprocket wheel 3.

As for the protrusions 13 on the large-diameter sprocket wheel 1, they are similarly used during the gear-down process of the drive chain 4 from the large-diameter sprocket wheel 1 to the intermediate-diameter sprocket wheel 2 to prevent the drive chain 4 from being from getting too near to the hooking member 12 to get hooked by the hooking member 21, thus allowing the drive chain 4 to be shifted smoothly down to the small-diameter sprocket wheel 3.

In conclusion, with the provision of the protrusions 11 on the large-diameter sprocket wheel 1, the drive chain 4 can be precisely and smoothly shifted to the intermediate-diameter sprocket wheel 2 even though the gear-up is made hastily. Furthermore, with the provision of the hooking members 12, 21 having a gap G at the bottom, the engagement of the drive chain 4 with the target sprocket wheel can be made very reliably.

Moreover, since protrusions 20 are provided on the intermediate-diameter sprocket wheel 2 near the hooking members 21, the links will not be hooked by the hooking member 21, so that the drive chain 4 can be shifted very smoothly from the intermediate-diameter sprocket wheel 2 down to the intermediate-diameter sprocket wheel 2. The drawbacks of the prior art are therefore solved. Besides, the protrusions provided on the large-diameter sprocket wheel I near the protrusions 13 also provide the same effect.

Figure 9:
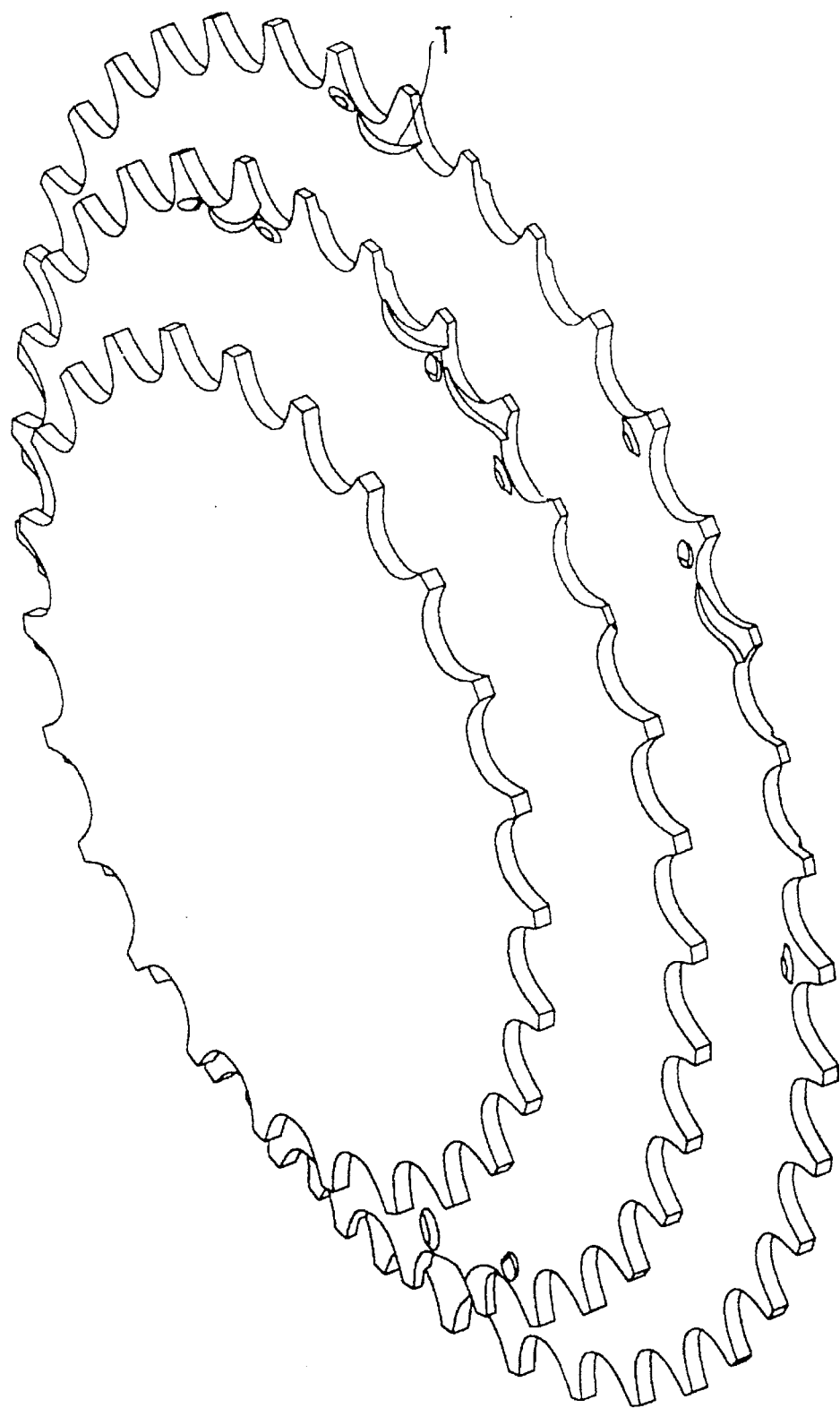
FIG. 9 is a perspective view showing a cutaway portion provided in cooperation with the gear-up assistant hooking member.

In another preferred embodiment of the present invention, a cutaway portion T can be formed on side of the teeth corresponding to the position of the hooking members, as illustrated in FIG. 9. The provision of the cutaway portion T not only allows the drive chain to be more easily geared up by means of the imbedding of its links in the gap provided by the hooking members, and also allows the links of the drive chain to be more easily engaged with the teeth of the sprocket wheel.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A freewheel gear cluster provided on the rear of a bicycle of the type using a derailleur to shift its drive chain between at least a large-diameter sprocket wheel, an intermediate-diameter sprocket wheel, and a small-diameter sprocket wheel, wherein the improvement comprising:

a plurality of protrusions provided on the rim of the large-diameter sprocket wheel on the side facing the intermediate-diameter sprocket wheel, said plurality of protrusions being used to prevent the drive chain from overshooting to the large-diameter sprocket wheel when the drive chain is being shifted from the small-diameter sprocket wheel to the intermediate-diameter sprocket wheel.

2. A freewheel gear cluster provided on the rear of a bicycle of the type using a derailleur to shift its drive chain between at least a large-diameter sprocket wheel and a small-diameter sprocket wheel and having gear-up assistant hooking members provided on the rim of the large-diameter sprocket on the side facing the small-diameter sprocket wheel, wherein the improvement comprising:

a plurality of protrusions provided on the rim of the large-diameter sprocket wheel near the gear-up assistant hooking members, said plurality of protrusions being used to prevent the drive chain from being hooked up by the gear-up assistant hooking members when the drive chain is being shifted from the large-diameter sprocket wheel down to the small-diameter sprocket wheel.

3. An improvement as claimed in claim 1 or 2, wherein said plurality of protrusions are dome-shaped.

4. An improvement as claimed in claim 2, wherein said plurality of protrusions are each provided beneath the valley between two adjacent teeth and located at a tooth's distance from one of the gear-up assistant hooking members.

5. An improvement as claimed in claim 4, wherein said plurality of protrusions are substantially equal in height to the gear-up assistant hooking members.

6. A freewheel gear cluster provided on the rear of a bicycle of the type using a derailleur to shift its drive chain between at least a large-diameter sprocket wheel and a small-diameter sprocket wheel and having gear-up assistant hooking members provided on the rim of the large-diameter sprocket on the side facing the small-diameter sprocket wheel, wherein the improvement comprising:

a gap provided between the bottom of the gear-up assistant member and the sprocket wheel capable of imbedding the links of the drive chain so as to allow the drive chain to be shifted smoothly.

7. An improvement as claimed in claim 6, wherein a cutaway portion is formed beside teeth of the large-diameter sprocket wheel so as to allow the gear-up of the drive chain to be reliable carried out.

\* \* \* \* \*